March 16, 1926.
P. S. LYON ET AL
1,576,665
APPARATUS FOR HEATING AND DEAERATING WATER
Filed April 14, 1925
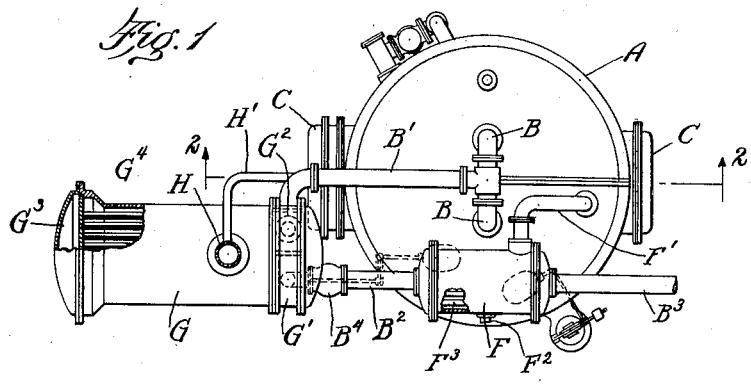
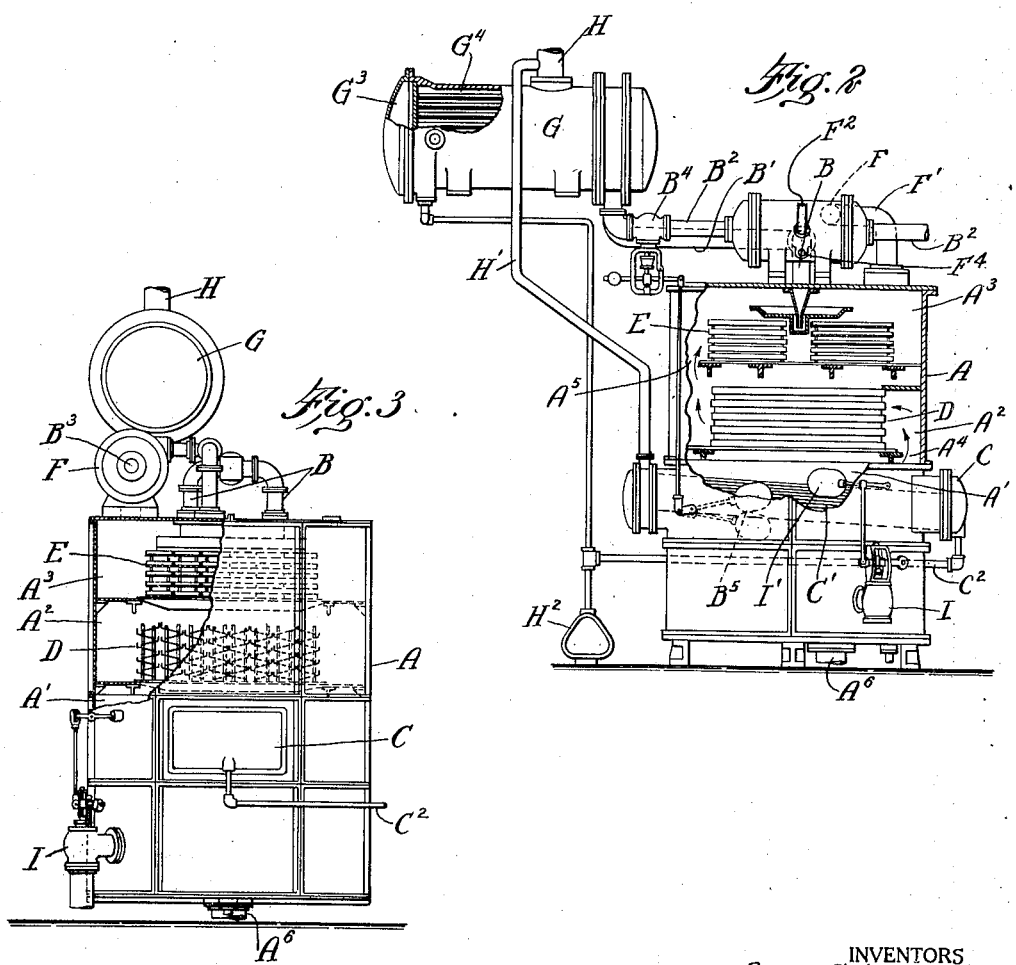
INVENTORS
PERCY S. LYON and
VICTOR A. ROHLIN
BY
John E. Hubbell
ATTORNEY Patented Mar. 16, 1926.

1,576,665

UNITED STATES PATENT OFFICE.

PERCY S. LYON AND VICTOR A. ROHLIN, OF PHILADELPHIA, PENNSYLVANIA, ASSIGNORS TO COCHRANE CORPORATION, OF PHILADELPHIA, PENNSYLVANIA, A CORPORATION OF PENNSYLVANIA.

APPARATUS FOR HEATING AND DEAERATING WATER.

Application filed April 14, 1925. Serial No. 23,087.

*To all whom it may concern:*

Be it known that we, PERCY S. LYON, a citizen of the United States, and a resident of Philadelphia, in the county of Philadelphia and State of Pennsylvania, and VICTOR A. ROHLIN, a citizen of the United States, and a resident of Philadelphia, in the county of Philadelphia and State of Pennsylvania, have invented certain new and useful Improvements in Apparatus for Heating and Deaerating Water, of which the following is a specification.

The general object of our present invention is to provide improved apparatus for heating and deaerating water, and the invention is characterized by features of construction and arrangement, and by advantages and specific objects attained which are set forth and explained in the accompanying drawings and the following descriptive matter in which we have illustrated and described a preferred embodiment of the invention.

Of the drawings:

Fig. 1 is a plan view;

Fig. 2 is an elevation partly in section on the line 2—2 of Fig. 1; and

Fig. 3 is an elevation taken at right angles to Fig. 2 with parts broken away and in section.

In the drawings, A represents a deaerating heater comprising a heating and deaerating chamber to the upper end of which water already partially heated, as hereinafter explained, is supplied through one or more pipes B. As shown, there are two pipes B. Additional heat is supplied to the water in the deaerator A by means of a tubular or closed heater C, comprising a bank of steam filled tubes C' which extend across the lower portion of the deaerator A and may be wholly or partially submerged in, or entirely above the body of water which fills the lower portion of the deaerator A. The heater C serves to evaporate enough of that water coming in contact with it to provide the steam required to remove from the heater the gases liberated therein, and to heat to the temperature of the steam generated, the water supplied to the deaerator A through the pipes B, as that water passes downward over a bank of trays E and then over a bank of trays D before reaching the pool or body of water in the lower portion of the deaerator. As shown, the trays D and E are so arranged, and such baffles and partitions are provided as to separate the interior of the deaerator A into a lower compartment A' through which the heater tubes C' extend, an intermediate chamber $A^2$ in which the bank of trays D are located, and an upper chamber $A^3$ in which the bank of trays E are located. Steam passes from the compartment A' into the compartment $A^2$ through a port $A^4$, and a port $A^5$ permits the passage of steam and liberated air from the compartment $A^2$ into the compartment $A^3$. Advantageously, and as shown, the disposition of the trays D, and of the baffles and partitions in the deaerator A are such as to provide superimposed parallel paths of steam flow through the bank of trays D, whereby air liberated at any upper level in the bank of trays D will not subsequently contact with the water at a lower level, but this arrangement of itself is not our invention but the invention of George H. Gibson and is disclosed in his application, Serial No. 740,049, filed September 26, 1924, and our invention furthermore, is not restricted to use in connection with a deaerating heater containing such provisions.

The pipes B receive water from the outlet of a closed heater G, which comprises inlet and outlet chambers G' and $G^2$ respectively, at one end, a chamber $G^3$ at its opposite end, and tubes $G^4$ connecting the inlet chamber G' and the chamber $G^3$, and other tubes $G^4$ connecting the chamber $G^3$ to the chamber $G^2$. The pipe B' connects the heater outlet chamber $G^2$ to the pipes B, and the chamber G' receives water from the outlet pipe $B^2$ of a tubular air cooler F which receives air and vapor mixture leaving the deaerator A through the outlet F', and in which the vapor content of said mixture is wholly or largely condensed, the condensate passing out through an outlet $F^4$, and the air is cooled before being discharged through the air outlet $F^2$. A steam jet ejector or other air exhausting means is connected to the outlet $F^2$ when a vapor pressure below that of the atmosphere is maintained in the chamber A, but when the pressure in the deaerator A is above that of the atmosphere no air exhausting means need be connected to the air cooler outlet and none is shown in the drawings. The air cooler F is desirably employed as it conserves heat, but may be omitted without impairing the effectiveness of the deaerating operation.

The water supply pipe proper B³ as shown, is connected to the pipe B² through the tubes F³ of the heater F. Water is supplied by the pipe B³ as required, the water supply being regulated for this purpose by a valve B⁴ shown as located in the pipe B² and controlled by a float B⁵. A⁶ represents the outlet from the chamber A for the heated and deaerated water, and I represents an overflow valve controlled by a float I' which may be employed to prevent the water level in the deaerator A from becoming unduly high. The heat required in the apparatus shown is furnished by steam supplied through a pipe H which opens directly to the interior of the shell of the heater G and is provided with a branch pipe H' supplying steam to the tubes C'. Water of condensation formed in the tubes C' is discharged through a drain C², the tubes C' being inclined as shown, to facilitate drainage. The drain C² leads to a steam trap H which also receives condensate formed in the inter-tube space of the heater G.

The general operation of the apparatus disclosed is as follows: The temperature of the water supplied by the pipe B³ is first increased somewhat in passing through the air cooler F, and the water then receives a substantial portion of the heat required to bring it to its delivery temperature in passing through the tubes G⁴ of the heater G. In the deaerating heater A the water receives the additional heat required from the heater C. As the water passes down over the trays D and E it is heated nearly or quite to its final temperature, depending on the heating and deaerating efficiency of the trays D and E, by steam formed from the water in the compartment A' by heat supplied by the heater C. With the particular tray arrangement illustrated it is contemplated that normally the water will be heated to its final temperature and its air content will be entirely eliminated before the water leaves the bank of trays D. In such case the temperature of the water will not be raised in the compartment A' but the water will therein absorb heat without change in temperature to provide the steam needed for heating the water to its final temperature as the water passes over the trays D and E, as well as to assist in moving the liberated air toward and through the outlet F'. All the steam thus generated is condensed in the compartments A² and A³ except such portion of the steam as passes out of the compartment A³ with the air through the air and vapor outlet F'.

As previously explained, the deaerating heater A shown in the drawings of itself contains nothing invented by us but our invention consists in essence in the described combination with a deaerator A of the general type illustrated, of the heater G for supplying a substantial portion of the heat which would otherwise have to be supplied by the heater C. In this combination the heat supplied to the water is furnished by a closed water heater comprising two sections C and G supplied with steam from a single source which in ordinary practice will be an intermediate stage of a turbine operated by steam formed in whole or in part from the water passing through the deaerating heater A, but the steam used may be the exhaust from auxilliaries or may come from any other available source.

The division of the heater of the deaerating apparatus into two sections of which one section G is outside of the deaerator A, and in which the water is partially heated before entering the deaerator A, gives a number of practical advantages. It permits of the use of a heater C substantially smaller than would otherwise be required, which is sometimes of especial importance because a heater C large enough to supply the total heat requirements of the deaerating apparatus could not find room in the deaerator A unless the latter were made larger than would otherwise be necessary. Another and more important advantage is that the aggregate heating surface required in the heaters C and G is substantially less than would be required in the heater C if that heater provided the total heating effect jointly provided by the two heaters C and G in accordance with our invention. This results in part from the fact that the temperature differential is appreciably greater in the heater G than would be in the heater C if the latter furnished the entire heating effect; and in part because the heat transfer co-efficient is inherently greater in the heater G than in the heater C. This difference in heat transfer co-efficient results from the fact that closed heater in which the water passes through the tubes and the steam contacts with the outer surfaces of the tubes as is the case in the heater G, is substantially more effective per unit of heating surface than a heater in which the water is in contact with the outer surfaces of steam filled tubes as is necessarily the case with the heater C.

While capable of and advantageously employed for other purposes, the invention is well adapted for use in a power plant in which the heat required in the deaerating apparatus is furnished by extraction steam from a turbine. In such use the water coming through the pipe B³ to the deaerating apparatus will ordinarily have already been partially heated in an extraction heater by steam withdrawn from a stage of the turbine at a lower pressure than that furnishing the steam used in the heaters G and C, but in practice it is not efficient or practical to so preliminarily heat the water sufficiently to make a substantial further heating unnecessary, and the use of the heater G in connection with the heater C increases the efficiency and reduces the cost and bulk of the heating and deaerating apparatus as we have explained without adding to the number of extraction steam outlets from the turbine otherwise required.

While in accordance with the provisions of the statutes we have illustrated and described the best form of our invention now known to us, it will be apparent to those skilled in the art that changes in form may be made without departing from the spirit of our invention as set forth in the appended claims, and that some features of our invention may sometimes be used to advantage without a corresponding use of other features.

Having now described our invention, what we claim as new and desire to secure by Letters Patents, is:

1. Water heating and deaerating apparatus comprising in combination a deaerating chamber having an upper water inlet from which the water heated passes through the upper portion of the chamber in divided form, a closed heater comprising steam-containing tubes in the lower portion of said chamber for boiling the water in contact therewith, and a closed water heater external to said chamber comprising a steam space traversed by tubes, means for passing the water treated to said chamber inlet through the last mentioned tubes, and a common source of steam supply for the steam space of the external heater and for the tubes of the first mentioned heater.

2. Water heating and deaerating apparatus comprising in combination a deaerating chamber containing a steam space and having a water inlet and means for passing the water from said inlet through said steam space in divided form, a closed heater comprising steam containing tubes within said chamber for evaporating a portion of the water passing into said chamber through said inlet and thereby supplying steam to said steam space, a closed water heater external to said chamber comprising a steam space traversed by tubes, means for passing the water treated to said chamber inlet through the last mentioned tubes, and a common source of steam supply for the steam space of the external heater and for the tubes of the first mentioned heater.

Signed at Philadelphia, in the county of Philadelphia, and State of Pennsylvania, this 7th day of April A. D. 1925.

PERCY S. LYON.
VICTOR A. ROHLIN.